(12) United States Patent
Sahashi

(10) Patent No.: US 8,508,760 B2
(45) Date of Patent: Aug. 13, 2013

(54) OUTPUT DEVICE CAPABLE OF PREVENTING THE LEAKAGE OF CONFIDENTIAL INFORMATION

(75) Inventor: Yukiko Sahashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1489 days.

(21) Appl. No.: 12/153,304

(22) Filed: May 16, 2008

(65) Prior Publication Data

US 2009/0033984 A1  Feb. 5, 2009

(30) Foreign Application Priority Data

Jul. 31, 2007  (JP) .................................. 2007-200112
Dec. 21, 2007  (JP) .................................. 2007-330257

(51) Int. Cl.
*G06K 15/00* (2006.01)
*G06F 3/12* (2006.01)

(52) U.S. Cl.
USPC ........................................ 358/1.14; 358/1.15

(58) Field of Classification Search
USPC .................................................. 358/1.15, 1.14
See application file for complete search history.

(56) References Cited

U.S. PATENT DOCUMENTS

| 6,515,575 | B1 | 2/2003 | Kataoka |
| 7,756,955 | B2* | 7/2010 | Takagi .......................... 709/221 |
| 7,965,401 | B2* | 6/2011 | Ishimaru ...................... 358/1.14 |
| 2003/0101342 | A1 | 5/2003 | Hansen |
| 2004/0201634 | A1* | 10/2004 | Collier et al. ..................... 347/7 |
| 2006/0012828 | A1* | 1/2006 | Ohta ............................. 358/1.18 |
| 2006/0072151 | A1* | 4/2006 | Amani et al. ................. 358/1.15 |
| 2006/0227371 | A1 | 10/2006 | Roksz |
| 2007/0127053 | A1* | 6/2007 | Tominaga ..................... 358/1.14 |

FOREIGN PATENT DOCUMENTS

| EP | 1 091 275 | 4/2001 |
| EP | 1 475 695 | 11/2004 |
| JP | 2003-150354 | 5/2003 |
| JP | 2006-108854 | 4/2006 |
| JP | 2006-185053 | 7/2006 |

OTHER PUBLICATIONS

European Search Report dated Jul. 27, 2010.

* cited by examiner

*Primary Examiner* — Eric A Rust
(74) *Attorney, Agent, or Firm* — Harness, Dickey & Pierce, P.L.C.

(57) ABSTRACT

An output device, such as a multifunction peripheral, prints data transmitted from a portable terminal device via contactless communication in such a manner as to prevent leakage of the data from a medium on which the data is printed, while the convenience of outputting data via wireless communication is maintained. A multifunction peripheral includes plural communication units having different communication areas. A determination unit of the multifunction peripheral identifies one of the communication units that receives the data from the portable terminal device. Based on the type of the identified communication unit, such as a Bluetooth communication unit, it is determined whether the portable terminal device is within a predetermined communication area. When the portable terminal device is within the predetermined communication area, a granting unit grants output of the received data from the output device.

10 Claims, 10 Drawing Sheets

FIG.6

| RADIO INTENSITY(dB) | −128 to −63 | −64 to −1 | 0 to 63 | 64 to 127 |
|---|---|---|---|---|
| DISTANCE(m) | < 5m | < 10m | < 20m | < 30m |

FIG.7

| AUTHENTICATION ID | DATA |
|---|---|
| person1 | material.pdf |
| person2 | presentation.ppc |
| ⋮ | ⋮ |

OUTPUT DEVICE CAPABLE OF PREVENTING THE LEAKAGE OF CONFIDENTIAL INFORMATION

BACKGROUND OF THE INVENTION

1. Field of the Invention

The present invention relates to output devices, information processing systems, and information processing methods.

2. Description of the Related Art

In the past few years it has become common to connect various devices via a wireless communication technology such as Bluetooth so that data can be transmitted and received between them. Such a wireless communication system is highly convenient because it allows a user to wirelessly or contactlessly instruct a printer, for example, equipped with a communication unit to print data, from a portable terminal device with its own communication unit adapted to technologies such as Radio Frequency Identification (RFID), Bluetooth, a wireless LAN, or Wireless USB (W-USB), as well as the conventional cellular phone network. However, because the transmission of such an instruction for printing data using a wireless communication technology involves wireless transmission and reception of data, it is difficult to specify a particular output unit from among a number of printers that are available for printing the data. Another disadvantage of the wireless transmission of an instruction for printing data is that if the printing of data starts at a time that is not desired by the user, confidential information printed on a medium may be leaked.

In order to solve this problem, Japanese Laid-Open Patent Application No. 2003-150354 proposes an image forming apparatus in which a recipient of data or information of confidential nature is authenticated without requiring any bothersome operations. Specifically, in this image forming apparatus, print data and user ID are received from a personal computer, and a search is conducted for a portable telephone device with which connection can be authenticated, by referring to a link key that is registered in association with the received user ID. If a portable telephone device that is successfully authenticated for communication exists within a piconet area, relevant print data is output, thus initiating an image forming process without requiring any bothersome operations.

However, in the aforementioned technology, because the personal computer that sends an instruction to the image forming apparatus for printing data is separated from the portable telephone device that is authenticated for connection, the user needs to enter the piconet area carrying the portable telephone device after sending the print instruction to the image forming apparatus.

It is therefore a general object of the present invention to provide a novel and useful output device, information processing system, and information-processing method in which the aforementioned problems are overcome. A more specific object of the present invention is to provide an output device capable of preventing the leakage of confidential information from a medium on which data is printed while the convenience of outputting data via wireless communication is maintained.

SUMMARY OF THE INVENTION

In one aspect, the invention provides an output device comprising plural communication units having different communication areas and configured to establish communication with a portable terminal device in order to receive data therefrom via contactless communication; a determination unit configured to identify the communication unit from among the plural communication units that receives the data from the portable terminal device, and configured to determine whether or not the portable terminal device is within a predetermined communication area based on the identified communication unit; a granting unit configured to grant output of the data when the portable terminal device is determined to be within the predetermined communication area; and an output unit configured to output the data whose output is granted by the granting unit.

In a preferred embodiment, the determination unit determines that the portable terminal device is within the predetermined communication area when the communication area of the identified communication unit is included in the predetermined communication area.

In another preferred embodiment, the output device includes a distance memory unit in which a radio wave intensity and a communication area of each of the communication units are stored in association with one another. The determination unit identifies the communication area associated with the radio wave intensity of the identified communication unit from the distance memory unit. The determination unit determines that the portable terminal device is within the predetermined communication area when the identified communication area is included in the predetermined communication area.

In another preferred embodiment, a first communication unit among the plural communication units is configured to receive authentication information together with the data from the portable terminal device via contactless communication. The authentication information is used for determining whether or not use of the output device should be granted. A second communication unit among the plural communication units which has a narrower communication area than the communication area of the first communication unit for communication with the portable terminal device is configured to receive the authentication information from the portable terminal device via contactless communication when the portable terminal device is within the communication area of the second communication unit. In this embodiment, the output device further comprises a memory unit capable of storing the data and the authentication information received by the first communication unit in association with one another; a storing unit configured to store the data and the authentication information received by the first communication unit in the memory unit in association with one another when it is determined by the determination unit that the portable terminal device is not within the predetermined communication area; and an authentication unit configured to authenticate use of the output device by the portable terminal device based on whether or not authentication information corresponding to the authentication information received by the second communication unit is stored in the memory unit. The granting unit grants output of the data associated with the authentication information with regard to which use of the output device by the portable terminal device is successfully authenticated by the authentication unit.

In another aspect, the invention provides an information processing system comprising a portable terminal device and an output device. Each of the portable terminal device and the output device includes plural communication units having different communication areas and configured to establish communication in order to transmit data from the portable terminal device to the output device via contactless communication. The output device includes a determination unit configured to identify one of the plural communication units of the output device that receives the data from the portable terminal device, and configured to determine whether or not the portable terminal device is within a predetermined communication area based on the identified communication unit; a granting unit configured to grant output of the received data from the output device when it is determined that the portable terminal device is within the predetermined communication area; and an output unit configured to output the data whose output is granted by the granting unit.

In a preferred embodiment, a first communication unit of the plural communication units of the portable terminal device is configured to transmit authentication information together with the data to the output device via contactless communication. The authentication information is used for determining whether or not use of the output device should be granted. A second communication unit of the plural communication units of the portable terminal device has a narrower communication area for communication with the output device than the communication area of the first communication unit. The second communication unit is configured to transmit the authentication information to the output device via contactless communication when the output device is within the communication area of the second communication unit. A third communication unit of the plural communication units of the output device is configured to receive the authentication information together with the data from the portable terminal device via contactless communication. A fourth communication unit of the plural communication units of the output device has a narrower communication area for communication with the portable terminal device than the communication area of the third communication unit. The fourth communication unit is configured to receive the authentication information from the portable terminal device via contactless communication when the portable terminal device is within the communication area of the fourth communication unit. The output device further comprises a memory unit in which the data and the authentication information received by the third communication unit can be stored in association with one another; a storing unit configured to store the data and the authentication information received by the third communication unit in the memory unit in association with one another when it is determined by the determination unit that the portable terminal device is not within the predetermined communication area; and an authentication unit configured to authenticate use of the output device by the portable terminal device based on whether or not authentication information corresponding to the authentication information received by the fourth communication unit is stored in the memory unit. The granting unit grants output of the data associated with the authentication information with regard to which use of the output device by the portable terminal device is authenticated by the authentication unit.

In another aspect, the invention provides a method of outputting data via an output device with which a portable terminal device is configured to communicate via contactless communication. Each of the output device and the portable terminal device includes plural communication units having different communication areas. The method comprises the steps of establishing communication between the output device and the portable terminal device; receiving data from the portable terminal device via contactless communication; identifying one of the plural communication units of the output device that receives the data from the portable terminal device; determining whether the portable terminal device is within a predetermined communication area based on the identified communication unit of the output device; granting output of the received data from the output device when it is determined that the portable terminal device is within the predetermined communication area; and outputting the data whose output is granted in the granting step.

In another preferred embodiment, the determining step determines that the portable terminal device is within the predetermined communication area when the communication area of the identified communication unit is included in the predetermined communication area.

In another preferred embodiment, the method includes the steps of storing a radio wave intensity and a communication area of each of the communication units of the output device in association with one another; measuring a radio wave intensity of the identified communication unit; identifying a communication area associated with a radio wave intensity of the identified communication unit based on information about the radio wave intensity and the communication area of each of the communication units of the output device that is stored in the storing step; and determining that the portable terminal device is within the predetermined communication area when the identified communication area of the communication unit is included in the predetermined communication area.

In yet another embodiment, the method includes the steps of receiving, with a first communication unit among the plural communication units of the output device, authentication information together with the data from the portable terminal device via contactless communication; receiving, with a second communication unit among the plural communication units of the output device which has a narrower communication area than the communication area of the first communication unit, the authentication information from the portable terminal device via contactless communication when the portable terminal device is within the communication area of the second communication unit; storing the data and the authentication information received by the first communication unit in association with one another when it is determined that the portable terminal device is not within the predetermined communication area; authenticating use of the output device by the portable terminal device based on whether authentication information corresponding to the authentication information received by the second communication unit is stored; granting output of the data from the output device which data is associated with the authentication information with regard to which use of the output device by the portable terminal device is successfully authenticated in the authentication step.

Thus, in accordance with an embodiment, output of data from the output device is granted when it is determined that the portable terminal device that transmits the data is within a predetermined communication area. Thus, leakage of confidential information from a medium on which the data is printed, for example, can be prevented while the convenience of data output via wireless communication is maintained.

BRIEF DESCRIPTION OF THE DRAWINGS

These and other objects, features and advantages of the invention will be apparent to those skilled in the art from the following detailed description of the invention, when read in conjunction with the accompanying drawings in which:

FIG. 6 shows an example of a data structure of a distance memory unit;

FIG. 7 shows an example of a data structure of an authentication data storing unit;

DETAILED DESCRIPTION OF THE PREFERRED EMBODIMENTS

In the following, the present invention is described by way of embodiments with reference made to the attached drawings. It should be noted, however, that the present invention is not limited by any of the following embodiments.

In one embodiment of the present invention, a multifunction peripheral (MFP) is described as an example of an output device. A multifunction peripheral is capable of performing multiple functions, such as a copier function, a facsimile (FAX) function, a printer function, a scanner function, and an image data distributing function (by which input image data that may have been scanned, formed, or received with the scanner function, the printer function, or the FAX function, respectively, can be distributed).

Figure 1:
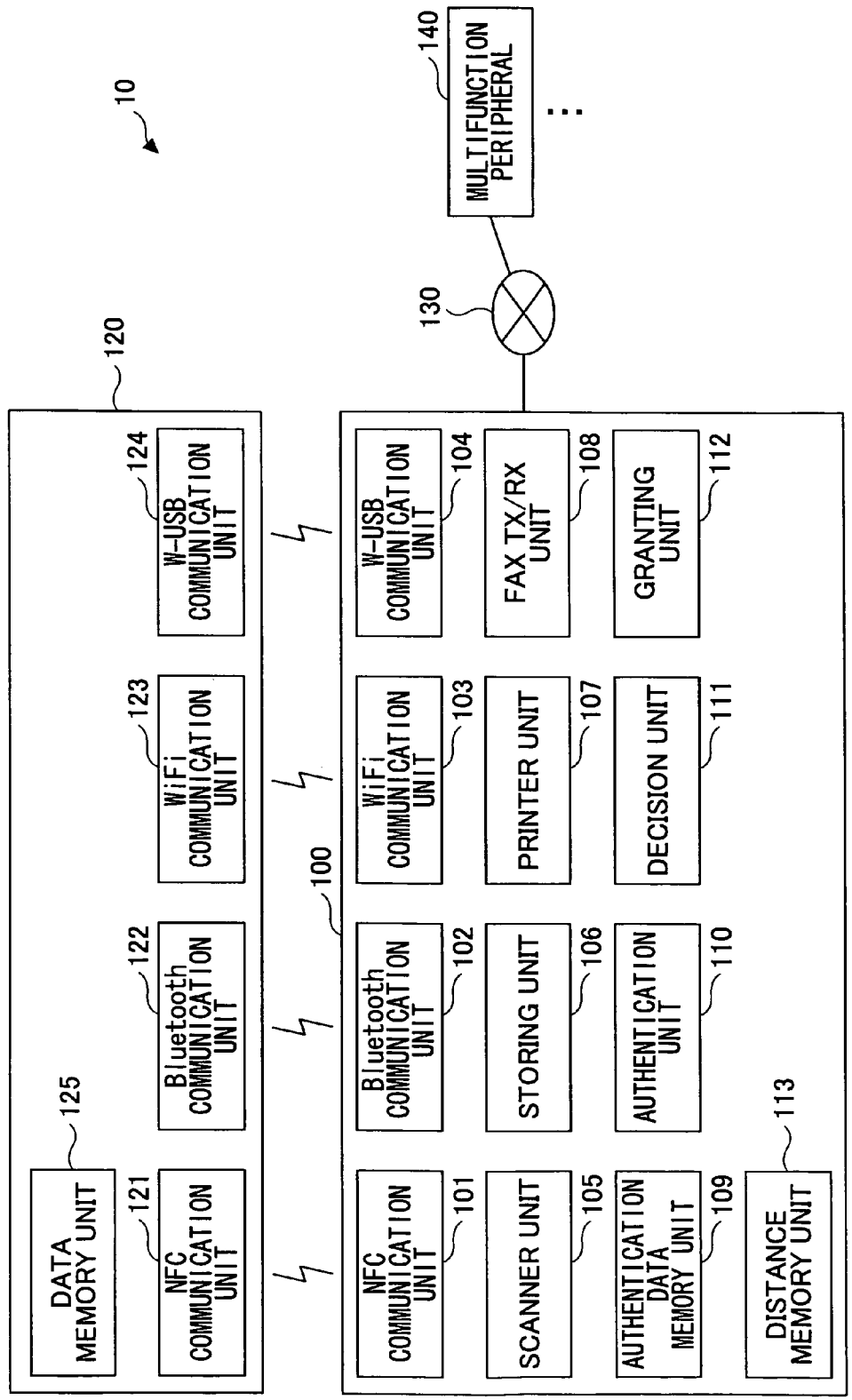
FIG. 1 shows a block diagram of an information processing system according to an embodiment of the present invention.

Initially, an information processing system 10 is described which includes a multifunction peripheral 100 and a portable terminal device 120. FIG. 1 shows a block diagram of the information processing system 10. In the information processing system 10, the multifunction peripheral 100 can communicate with the portable terminal device 120 via plural communication units. The multifunction peripheral 100 is connected to a network 130 via which it may be further connected to another multifunction peripheral 140, a facsimile device (not shown), or a client terminal device (not shown).

The multifunction peripheral 100 includes an NFC communication unit 101, a Bluetooth communication unit 102, a WiFi communication unit 103, a wireless USB (W-USB) communication unit 104, a scanner unit 105, a storing unit 106, a printer unit 107, a facsimile transmit/receive unit 108, an authentication data memory unit 109, an authentication unit 110, a determination unit 111, a granting unit 112, and a distance memory unit 113.

The NFC communication unit 101 is configured to bidirectionally and contactlessly communicate with the portable terminal device 120 in accordance with a wireless communication standard called Near Field Communication (NFC), which involves a contactless IC and the like. Specifically, the NFC communication unit 101 has the function of a tag and/or a reader/writer including a communication control program for contactlessly reading information from an NFC communication unit 121 of the portable terminal device 120, which is described later. Compared with the other communication units of the multifunction peripheral 100, i.e., the Bluetooth communication unit 102, the WiFi communication unit 103, and the W-USB communication unit 104, the communication distance of the NFC communication unit 101 is small on the order of less than 20 cm. Because the data transfer speed (100 to 400 kbps) of the NFC communication unit 101 in accordance with the NFC standard is slower than that (1 to 2 Mbps) of the Bluetooth communication unit 102 in accordance with the Bluetooth standard, the NFC communication unit 101 is used for communication of data with relatively small volumes. However, the communication standard for the NFC communication unit 101 is not limited to NFC. Any other communication standard may be employed as long as it is adapted to communications for an area smaller than the communication areas of the Bluetooth technology, the W-USB standard, and a wireless LAN standard. One example of an alternative communication standard is the Infrared Data Association (IrDA) standard. The NFC communication unit 101 may be referred to as a first communication unit.

Figure 2:
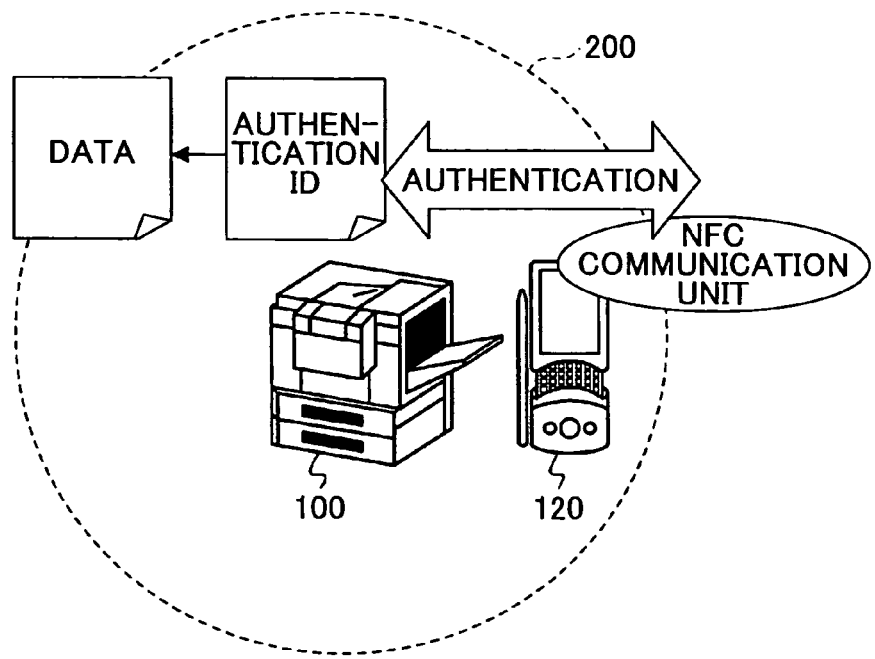
FIG. 2 illustrates a process of establishing communication with an NFC communication unit of a portable terminal device and then receiving authentication ID from the portable terminal device.
Figure 3:
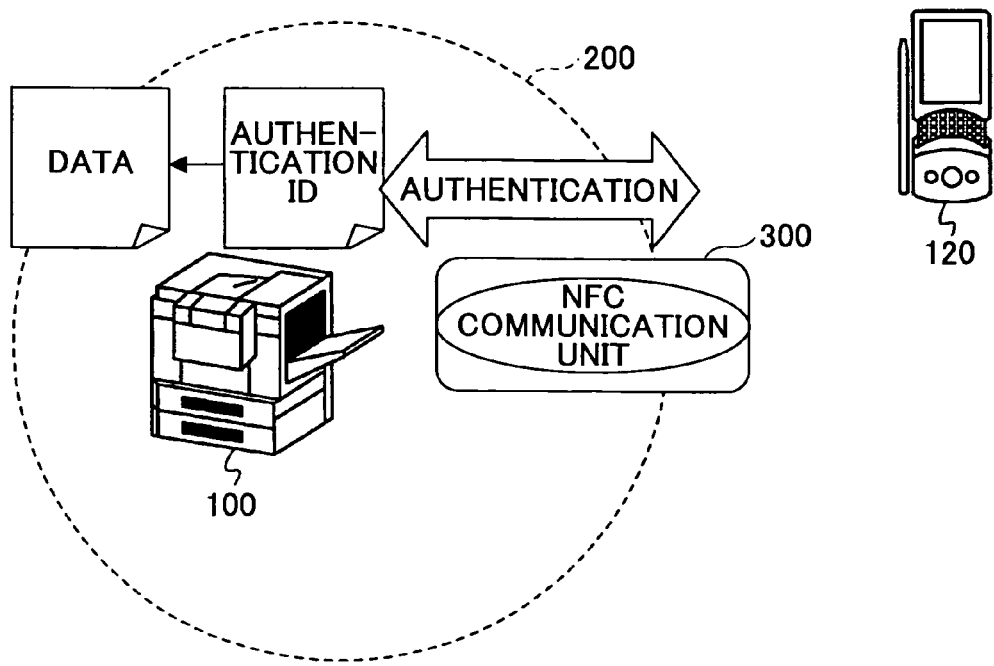
FIG. 3 illustrates a process of establishing communication between a contactless IC card having an NFC chip and an NFC communication unit, and then receiving authentication ID from the contactless IC card.

When the portable terminal device 120 exists within a communication area 200 of the NFC communication unit 101, the NFC communication unit 101 establishes communication with the NFC communication unit 121 of the portable terminal device 120 in accordance with the same communication protocol as that of a communication control program in the NFC communication unit 121 of the portable terminal device 120, and then receives an authentication ID transmitted from the portable terminal device 120. FIG. 2 illustrates the process of the multifunction peripheral 100 establishing communication with the NFC communication unit 121 of the portable terminal device 120 and receiving the authentication ID therefrom. FIG. 3 illustrates a process of the NFC communication unit 101 of the multifunction peripheral 100 establishing communication with a contactless IC card 300 having a built-in NFC chip (NFC communication unit 121). As shown in FIGS. 2 and 3, the multifunction peripheral 100 receives the authentication ID from the portable terminal device 120 or the contactless IC card 300 when the portable terminal device 120 or the contactless IC card 300 exists within the communication area 200 of the NFC communication unit 101.

The "authentication ID" refers to information based on which the use of the multifunction peripheral 100 in accordance with an instruction from the portable terminal device 120 is granted or not granted. The authentication ID may consist of information uniquely allocated to the portable terminal device 120, or information identifying the user in possession of the portable terminal device 120, such as his employee ID.

The Bluetooth communication unit 102 is configured to communicate with the portable terminal device 120 contactlessly in accordance with the Bluetooth standard. When the portable terminal device 120 is within the communication area of the Bluetooth communication unit 102, the Bluetooth communication unit 102 establishes communication with a Bluetooth communication unit 122 of the portable terminal device 120 using the same communication protocol as that of a communication control program in the Bluetooth communication unit 122 of the portable terminal device 120, and receives data transmitted from the portable terminal device 120. The Bluetooth communication unit 102 using the Bluetooth wireless communication standard is capable of transmitting or receiving a greater amount of data at higher speed (1 to 10 Mbps) than the NFC communication unit 101 of the NFC standard. The Bluetooth communication unit 102 is also capable of overcoming blocking obstacles within the distance of up to 10 m. Thus, the Bluetooth communication unit 102 has a grater communication area than the NFC communication standard.

More specifically, the Bluetooth communication unit 102 includes a Bluetooth interface (I/F) for data transmission/reception, which may consist of a transceiver of the Bluetooth standard; a radio wave intensity meter for measuring radio wave intensity; and a communication control unit. The Bluetooth I/F handles data transmission/reception to or from the portable terminal device 120 with which it is connected. The radio wave intensity meter is configured to measure the intensity of a radio wave emitted by the portable terminal device 120 and received via the Bluetooth I/F. The communication control unit includes a communication control program for executing a process for establishing wireless communication with the portable terminal device 120 for data transmission/reception via the Bluetooth. I/F in accordance with the Bluetooth standard. The data that is transmitted or received may be image data, document data, text data, or various other types of data.

The WiFi communication unit 103 is configured to perform contactless communications in accordance with a wireless LAN standard, such as IEEE802.11a, IEEE802.11b, IEEE802.11n, or IEEE802.11g. When the portable terminal device 120 is within the communication area of the WiFi communication unit 103, the WiFi communication unit 103 establishes communication with a WiFi communication unit 123 of the portable terminal device 120 in accordance with the same communication protocol as that of a communication control program in the WiFi communication unit 123 of the portable terminal device 120, and receives data transmitted by the portable terminal device 120. The WiFi communication unit 103, using a wireless LAN standard, is capable of transmitting or receiving a greater volume of data at higher speed (1 to 2 Mbps) than the NFC communication unit 101 using the NFC standard. The WiFi communication unit 103 is capable of transmitting or receiving data within the distance of 100 m between the devices. Thus, the WiFi communication unit 103 has a greater communication area than the communication area of the NFC standard. The communicable distance of the WiFi communication unit 103 may decrease depending on the surrounding conditions, such as the presence of obstacles between the devices, radio wave conditions, or the material of intervening walls.

More specifically, the WiFi communication unit 103 includes an IEEE802.11a/IEEE802.11b I/F for data transmission/reception, such as an IEEE802.11a/IEEE802.11b-standard network board, and a communication control unit. The WiFi communication unit 103 does not include a radio wave intensity meter. This is due to the fact that because the communicable distance of contactless communications based on a wireless LAN standard is subject to surrounding conditions, it is difficult to specify the distance between devices based on a radio wave intensity. The IEEE802.11/IEEE802.11b I/F is configured to handle data transmission/reception to or from the portable terminal device 120 with which the WiFi communication unit 103 is connected. The communication control unit includes a communication control program for executing a process for establishing wireless communication with the portable terminal device 120 for data transmission/reception via the IEEE802.11/IEEE802.11b I/F in accordance with the IEEE802.11/IEEE802.11b standard. The data that is transmitted or received may be image data, document data, text data, or various other types of data.

The W-USB communication unit 104 is configured to perform contactless communication using an Ultra-Wideband (UWB) device of a Wireless USB standard. When the portable terminal device 120 is within the communication area of the W-USB communication unit 104, the W-USB communication unit 104 establishes communication with a W-USB communication unit 124 of the portable terminal device 120 using the same communication protocol as that of a communication control program in the W-USB communication unit 124 of the portable terminal device 120, and receives data transmitted by the portable terminal device 120. The W-USB communication unit 104 employing the UWB device is capable of performing communications in accordance with a UWB communication standard at 480 Mbps, which is comparable to the wired USB 2.0, within the distance between the devices of up to 3 m. The W-USB communication unit 104 using the UWB device has high position detection accuracy, with an error of within several centimeters.

Specifically, the W-USB communication unit 104 includes a W-USB I/F which may consist of a UWB device compatible with the wireless USB standard for data transmission/reception, and a communication control unit. The W-USB communication unit 104 does not include a radio wave intensity meter, such as the one of the WiFi communication unit 103. This is due to the fact that the communication area of contactless communication based on the wireless USB standard is narrow, requiring that the user in possession of the portable terminal device 120 be relatively close to the multifunction peripheral 100. Thus, there is no need to determine whether or not the portable terminal device 120 is close to the multifunction peripheral 100 by identifying the distance between the devices based on a radio wave intensity. The W-USB I/F is configured to handle data transmission/reception to or from the portable terminal device 120 with which the W-USB communication unit 104 is connected. The communication control unit includes a communication control program for executing a process for establishing wireless communication via the W-USB I/F in accordance with the wireless USB standard in order to transmit or receive data to or from the portable terminal device 120. The data that is transmitted or received may be image data, document data, text data, or various other data.

Upon reception of data from the portable terminal device 120, the determination unit 111 identifies either the Bluetooth communication unit 102, the WiFi communication unit 103, or the W-USB communication unit 104 as the communication unit that has received the data. Based on the specified communication unit, the determination unit 111 determines whether or not the portable terminal device 120 is within a predetermined communication area. In other words, the determination unit 111 identifies the communication unit of the portable terminal device 120 from which the data has been transmitted. The predetermined communication area herein refers to an area that is within the view of the user in possession of the portable terminal device 120 from which an output instruction has been sent. In the present embodiment, the predetermined communication area is defined as the communication area of the W-USB communication unit 104, or 3 m.

Figure 4:
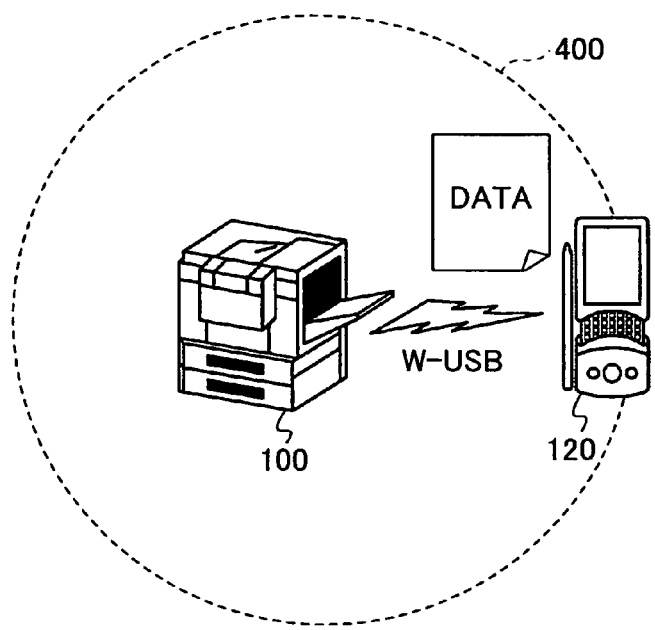
FIG. 4 illustrates a case where a W-USB communication unit is identified as the communication unit that has received the data.
Figure 5:
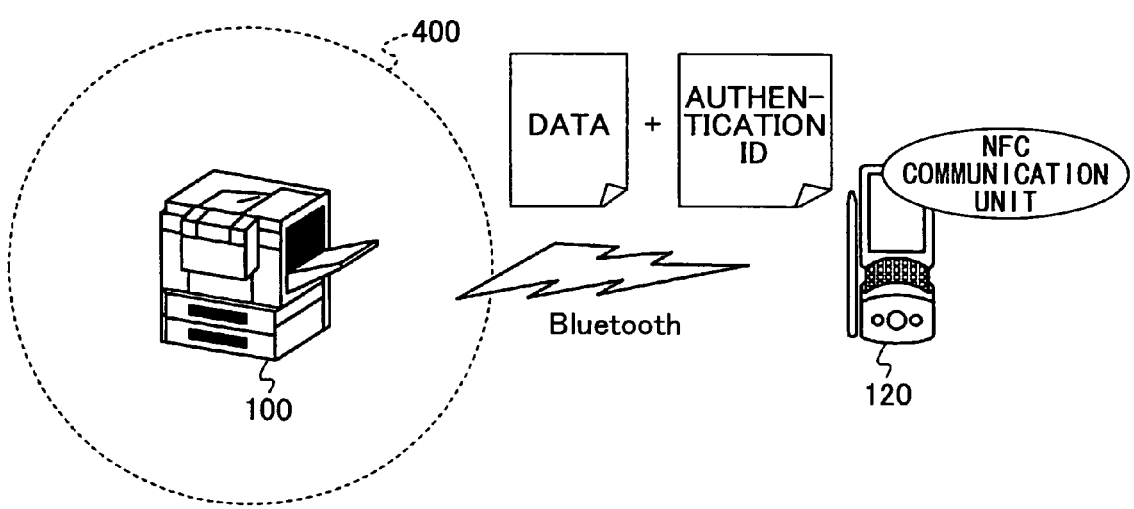
FIG. 5 illustrates a case where a Bluetooth communication unit is identified as the communication unit that has received the data.

Specifically, depending on whether the communication area of the identified communication unit is within the communication area of the W-USB communication unit 104, it is determined whether or not the portable terminal device 120 exists within the predetermined communication area. FIG. 4 illustrates an example in which the W-USB communication unit 104 is identified as the communication unit that received the data. As shown in FIG. 4, because the communication area of the W-USB communication unit 104 (within 3 m) is included in the predetermined communication area (within 3 m) 400, the portable terminal device 120 is determined to exist within the predetermined communication area 400. FIG. 5 illustrates another example in which the Bluetooth communication unit 102 is identified as the communication unit that has received the data. As shown in FIG. 5, because the communication area of the Bluetooth communication unit 102 (within 10 m) is not included within the predetermined communication area (within 3 m), the portable terminal device 120 is determined to not exist within the predetermined communication area 400. When it is determined that the portable terminal device 120 does not exist within the predetermined communication area 400, the multifunction peripheral 100 stores the received data and the authentication ID received together with the data in association with one another.

When the communication unit that received the data has the unit for identifying the communicable distance between the devices, it can be determined whether the portable terminal device 120 exists within the predetermined communication area based on the communicable distance. In this case, the determination unit 111 refers to the data distance memory unit 113 to identify a communication area associated with the radio wave intensity measured at the communication unit that received the data. If the identified communication area is included within the predetermined communication area, it is determined that the portable terminal device 120 is within the predetermined communication area. More specifically, a communicable distance associated with the radio wave intensity measured by the Bluetooth communication unit 102 is identified from the distance memory unit 113, which is described later. If the identified communicable distance is smaller than the communicable distance of the W-USB communication unit 103, i.e., 3 m, it is determined that the portable terminal device 120 exists within the predetermined communication area.

In the distance memory unit 113, radio wave intensities and communication areas of the Bluetooth communication unit 102 are stored in association with one another. This, however, is merely an example. In another embodiment, when another communication unit (such as the WiFi communication unit 102) has its own radio wave intensity meter, radio wave intensities and communication areas may be stored in association with one another on an individual communication unit basis.

FIG. 6 shows an example of the data structure in the distance memory unit 113. In the distance memory unit 113, radio wave intensities (dB) and communicable distances (m) in accordance with the Bluetooth standard are stored in association with one another. As shown in FIG. 6, the communicable distance of the Bluetooth-standard wireless communication varies depending on the radio wave intensity measured by the Bluetooth communication unit 102. The communicable distances stored in association with the radio wave intensities are values calculated empirically and may vary depending on the surrounding conditions.

When it is determined by the determination unit 111 that the portable terminal device 120 is not within the predetermined communication area, the storing unit 106 stores the received data and authentication information in an authentication data memory unit 109 in association with one another. Specifically, it is determined whether an authentication ID has been received together with the data, and if so, the data and the authentication ID are stored in the authentication data memory unit 109 associated with one another. If no authentication ID is received together with the data, the storing unit 106 does not store the data in the authentication data memory unit 109 but instead sends an instruction to the printer unit 107 to print the data.

The authentication unit 103 determines whether or not the authentication ID transmitted from the portable terminal device 120 is an authentication ID for which the use of the multifunction peripheral 100 is permitted. Specifically, authentication is performed based on whether the authentication ID received by the NFC communication unit 101 is stored in the authentication data memory unit 109.

The authentication data memory unit 109 stores the data received by the Bluetooth communication unit 102, the WiFi communication unit 103, or the W-USB communication unit 104 in association with the authentication data for determining whether or not the multifunction peripheral 100 can be used. FIG. 7 shows an example of the data structure in the authentication data memory unit 109, in which the received data and the authentication ID are stored in association with one another. As shown in FIG. 7, the authentication ID "person1" is stored in association with the data "material.pdf." The authentication ID "person2" is stored in association with the data "presentation.ppt."

When it is determined by the determination unit 111 that the portable terminal device 120 is within the predetermined communication area, the granting unit 112 grants the output of the received data. Specifically, when it is determined that the portable terminal device 120 exists within the predetermined communication area, the granting unit 112 sends an instruction to the printer unit 107 to print the received data.

When the use of the multifunction peripheral 100 by the portable terminal device 120 is authenticated by the authentication unit 110, the granting unit 112 grants the output of the data associated with the authentication ID that has successfully been authenticated. Specifically, the granting unit 112 obtains from the authentication data memory unit 109 the data associated with the successfully authenticated authentication ID and then sends an instruction to the printer unit 107 to print the obtained data.

In the present embodiment, when it is determined that the portable terminal device 120 exists within the predetermined communication area, the printer unit 107 is instructed to produce an output. This, however, is merely an example. In another embodiment, when the multifunction peripheral 100 is connected with a display unit, such as an electronic paper, such a display unit may be instructed to display the data.

The printer unit 107 then prints the data whose output has been granted by the granting unit 112.

The scanner unit 105 is configured to read a manuscript using an imaging device, such as a charge-coupled device (CCD). The scanner unit 105 may be equipped with an auto document feeder (ADF) to automatically feed manuscripts.

The facsimile transmit/receive unit 108 may transmit data read by the scanner unit 105 or data transmitted from the portable terminal device 120 to the other multifunction peripheral 140, a facsimile device, or a client terminal, via a network. The facsimile transmit/receive unit 108 may also receive data transmitted from the other multifunction peripheral 140, the facsimile device, or the client terminal.

In the following, the portable terminal device 120 is described. The portable terminal device 120 includes the NFC communication unit 121, the Bluetooth communication unit 122, the WiFi communication unit 123, the W-USB communication unit 124, and the data memory unit 125. The portable terminal device 120 may consist of a cellular phone, a personal digital assistant (PDA), a notebook personal computer, or a portable information storage medium.

When the portable terminal device 120 is within the communication area of the NFC communication unit 101 of the multifunction peripheral 100, the NFC communication unit 121 establishes communication with the NFC communication unit 101 of the multifunction peripheral 100 using the same communication protocol as that of the communication control program in the NFC communication unit 101 of the multifunction peripheral 100, and transmits an authentication ID from the portable terminal device 120 to use the multifunction peripheral 100.

Specifically, the NFC communication unit 121 includes a tag and an NFC chip having a communication control program for establishing communication and controlling data transmission/reception. Within the tag, the aforementioned authentication ID is stored. As the NFC communication unit 121 moves closer to the multifunction peripheral 100 and enters the communication area of the multifunction peripheral 100, communication is established between them, and the information within the tag is read by the NFC communication unit (reader/writer) 101 of the multifunction peripheral 100.

Figure 8:
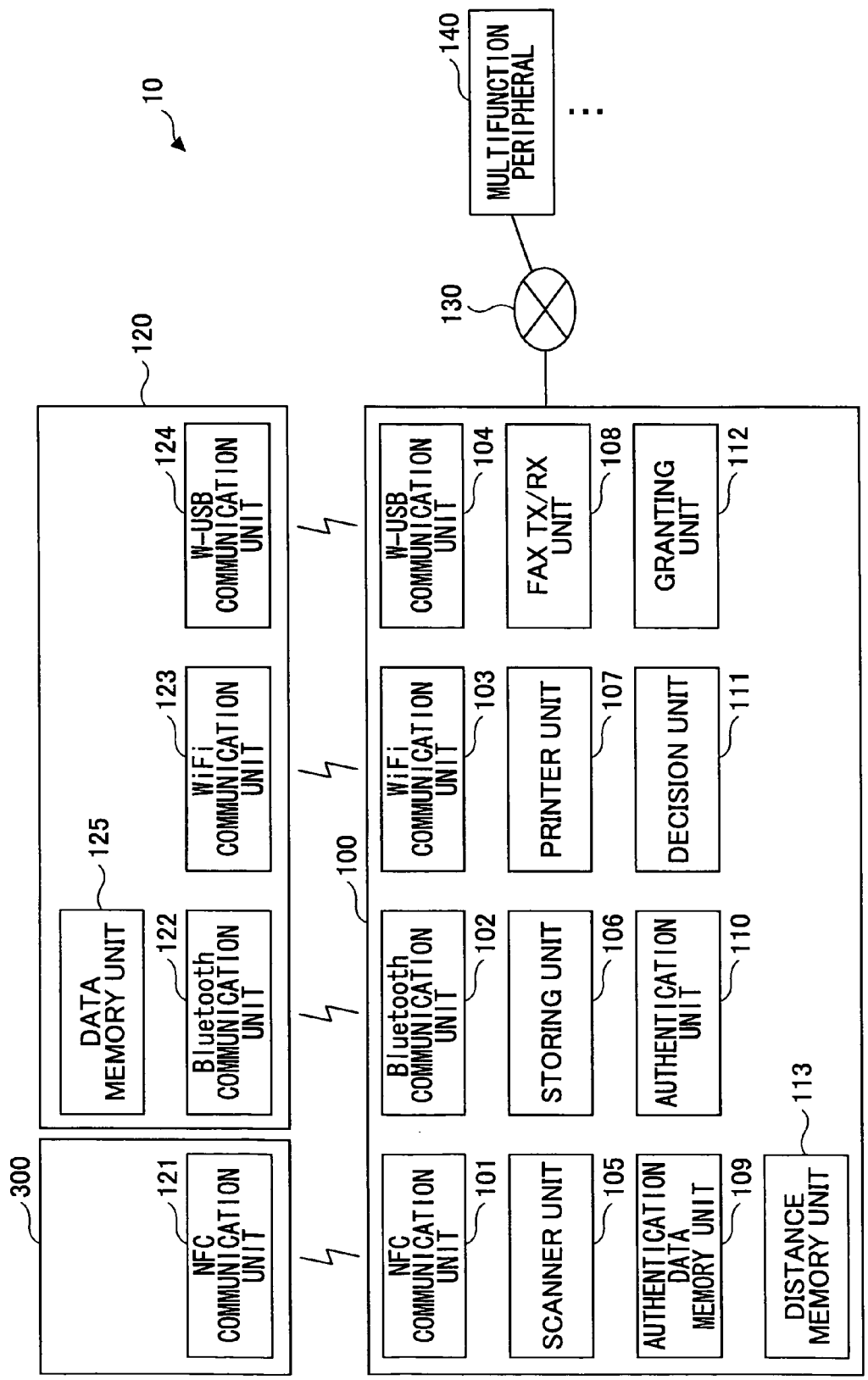
FIG. 8 shows a block diagram of an information processing system in which a contactless IC card is provided independently of the portable terminal device main body.

In another embodiment, as shown in FIG. 8, the tag and the NFC communication unit (NFC chip) 121 in which the communication control program is contained may be stored in a contactless IC card 300, so that the authentication ID can be transmitted to the multifunction peripheral 100 independently of the main body of the portable terminal device 120.

While in the present embodiment the tag in which an authentication ID is stored is provided in the NFC communication unit 121 of the portable terminal device 120, and the NFC communication unit 101 of the multifunction peripheral 100 is configured as a reader/writer, this is merely an example. In another example, the NFC communication unit 121 of the portable terminal device 120 may be configured as a reader/writer, and the NFC communication unit 101 of the multifunction peripheral 100 may be configured as a tag. In this case, an authentication ID is stored in the NFC communication unit 101 of the multifunction peripheral 100, and communication is established by bringing the NFC communication unit 121 of the portable terminal device 120 closer to the NFC communication unit 101. The authentication ID of the NFC communication unit 101 is then transferred to the NFC communication unit 121 by a control unit which is not shown. The authentication ID is read by the reader/writer in the NFC communication unit 121 and then processed by a control unit in the portable terminal device 120. Alternatively, both the NFC communication unit 121 of the portable terminal device 120 and the NFC communication unit 101 of the multifunction peripheral 100 may be provided with the functions of the tag and the reader/writer.

Upon establishment of communication with the Bluetooth communication unit 102 of the multifunction peripheral 100 using the same communication protocol as that of the communication control program in the NFC communication unit 101 of the multifunction peripheral 100, the Bluetooth communication unit 122 transmits the data and the authentication ID stored in the storing unit 125 to the multifunction peripheral 100.

Upon establishment of communication with the WiFi communication unit 103 of the multifunction peripheral 100 using the same communication protocol as that of the communication control program in the WiFi communication unit 103, the WiFi communication unit 123 transmits the data and the authentication ID stored in the data storing unit 105 to the multifunction peripheral 100.

Upon establishment of communication with the W-USB communication unit 104 of the multifunction peripheral 100 using the same protocol as that of the communication control program in the W-USB communication unit 104, the W-USB communication unit 124 transmits the data and the authentication ID stored in the data storing unit 105 to the multifunction peripheral 100.

In the data memory unit 125, there are stored an application (to be hereafter referred to as an "output application") for instructing the multifunction peripheral 100 to produce an output, the data to be output by the multifunction peripheral 100, and the authentication ID. The data that is transmitted may be image data, document data, text data, or various other types of data.

Figure 9:
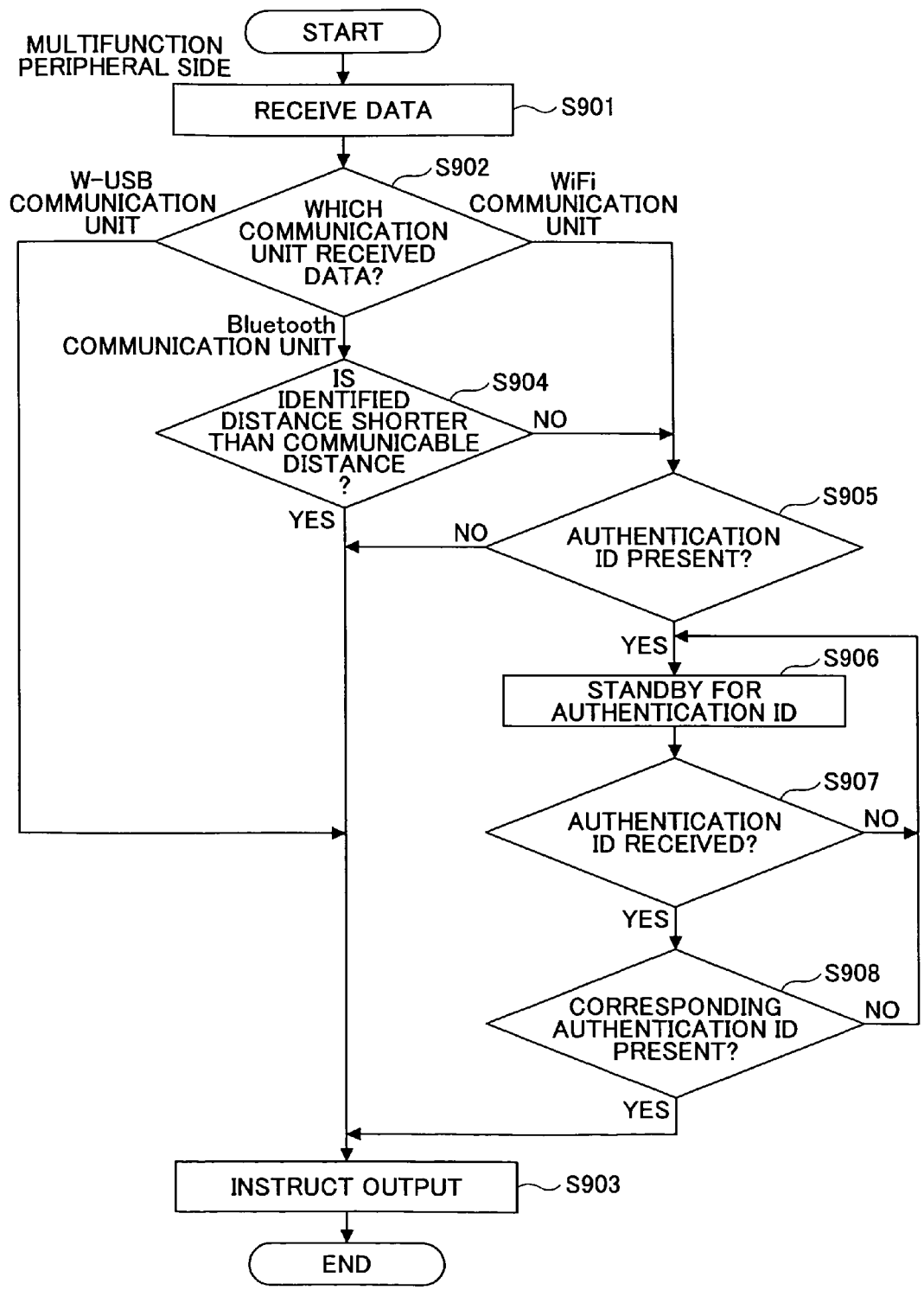
FIG. 9 shows a flowchart of a data output process performed by a multifunction peripheral.

In the following, a data output process performed by the multifunction peripheral 100 is described with reference to a flowchart shown in FIG. 9.

First, the multifunction peripheral 100 receives data from the portable terminal device 120 via the Bluetooth communication unit 102, the WiFi communication unit 103, or the W-USB communication unit 104 (step S901). The determination unit 111 then identifies the communication unit via which the data has been received from among the Bluetooth communication unit 102, the WiFi communication unit 103, and the W-USB communication unit 104 (step S902).

When the W-USB communication unit 104 is identified as the communication unit that received the data, the determination unit 111, determining that the portable terminal device 120 is within the communication area of the W-USB communication unit 104, sends a request to the granting unit 112 for outputting the received data ("W-USB communication unit" in step S902). In response, the granting unit 112 instructs the printer unit 107 to output (print) the received data (step S903).

When the Bluetooth communication unit 102 is identified as the communication unit that received the data, the determination unit 111 refers to the distance memory unit 113 to identify the communicable distance associated with the radio wave intensity at the Bluetooth communication unit 102, and determines whether or not the identified communicable distance is smaller than the communicable distance of the W-USB communication unit 104 (step S904). If the identified communicable distance is greater than the communicable distance of the W-USB communication unit 104, the determination unit 111 determines that the portable terminal device 120 is not within the communication area of the W-USB communication unit 104 ("No" in step S904), and the routine proceeds to step S905. On the other hand, if the identified communicable distance is smaller than the communicable distance of the W-USB communication unit 104 ("Yes" in step S904), the determination unit 111 determines that the portable terminal device 120 is within the communication area of the W-USB communication unit 104, and sends a request to the granting unit 112 for outputting the received data. The routine then proceeds to step S903.

When the WiFi communication unit 103 is identified as the communication unit that received the data, because the communication area of the WiFi communication unit 103 is not within the communication area of the W-USB communication unit 104, the determination unit 111 determines that the portable terminal device 120 is not within the communication area of the W-USB communication unit ("WiFi communication unit" in step S902). The routine then proceeds to step S905.

When it is determined by the determination unit 111 that the portable terminal device 120 is not within the communication area of the W-USB communication unit 104 ("WiFi communication unit" in step S902, or "No" in step S904), the storing unit 106 determines whether or not an authentication ID has been received together with the data (step S905). If no authentication ID has been received with the data ("No" in step S905), the storing unit 106 sends a request to the granting unit 112 for the output of the received data. The routine then proceeds to step S903.

On the other hand, if an authentication ID has been received together with the data ("Yes" in step S905), the NFC communication unit 101 waits for the reception of an authentication ID from the portable terminal device 120 (step S906). When an authentication ID is received from the portable terminal device 120 ("Yes" in step S907), the authentication unit 110 performs authentication based on whether the received authentication ID is stored in the authentication data memory unit 109 (step S908). Upon successful authentication of the authentication ID ("Yes" in step S908), the authentication unit 110 sends a request to the granting unit 112 for the output of the received data. The granting unit 112 then acquires data associated with the successfully authenticated authentication ID, and instructs the printer unit 107 to print the acquired data (step S903).

Figure 10:
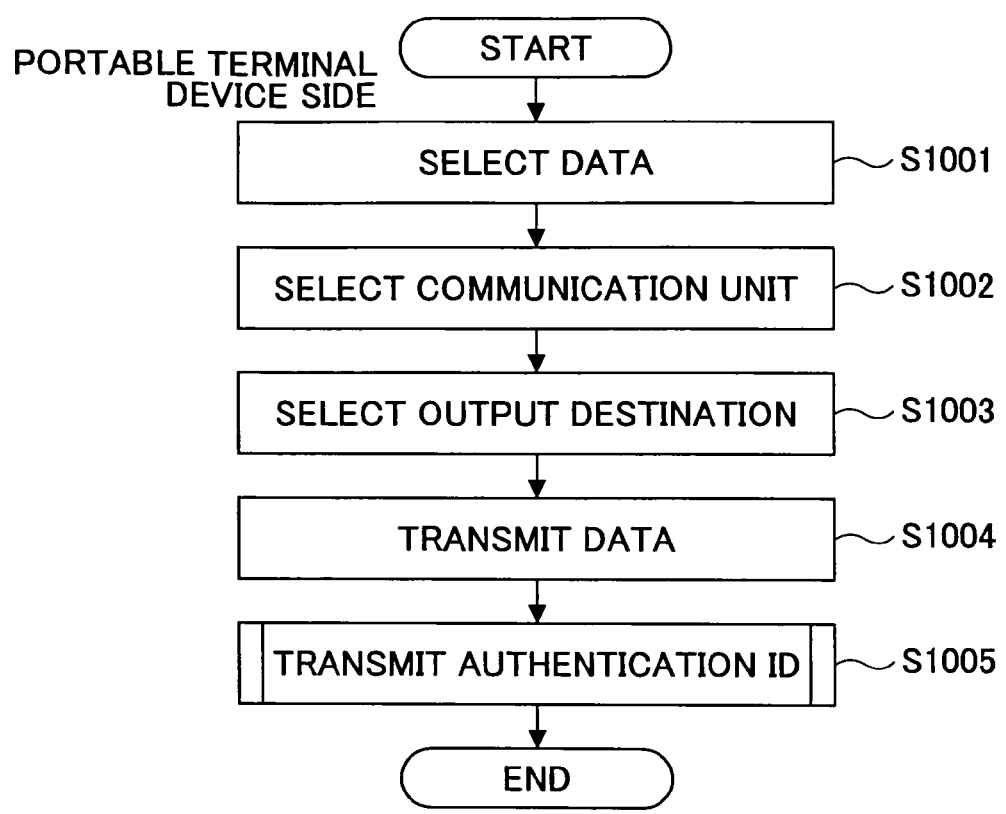
FIG. 10 shows a flowchart of a process of sending an output instruction performed by a portable terminal device.

In the following, a process of sending a data output request from the portable terminal device 120 to the multifunction peripheral 100 is described with reference to a flowchart shown in FIG. 10.

First, a user operates an operating unit (not shown) of the portable terminal device 120 to start up the communication control program. The communication control program first causes a display unit (not shown) to display a list of data stored in the data memory unit 125 so that the data to be transmitted to the multifunction peripheral 100 can be selected (step S1001). Then, the communication control program allows the user to select a communication unit for transmitting the selected data and the multifunction peripheral 100 to which the data is to be transmitted by the communication unit (steps S1002 and S1003).

The selected communication unit transmits the data and an authentication ID to the selected multifunction peripheral 100 (step S1004). The user may be allowed to make a setting either to transmit an authentication ID together with the data or not. When the user has not made an authentication-ID-transmit setting, the communication unit transmits the data alone to the multifunction peripheral 100.

After the data is transmitted to the multifunction peripheral 100, if a data output process is not performed by the multifunction peripheral 100, the user moves closer to the multifunction peripheral 100 and then transmits an authentication ID via the NFC communication unit 121 (step 1005).

Figure 11:
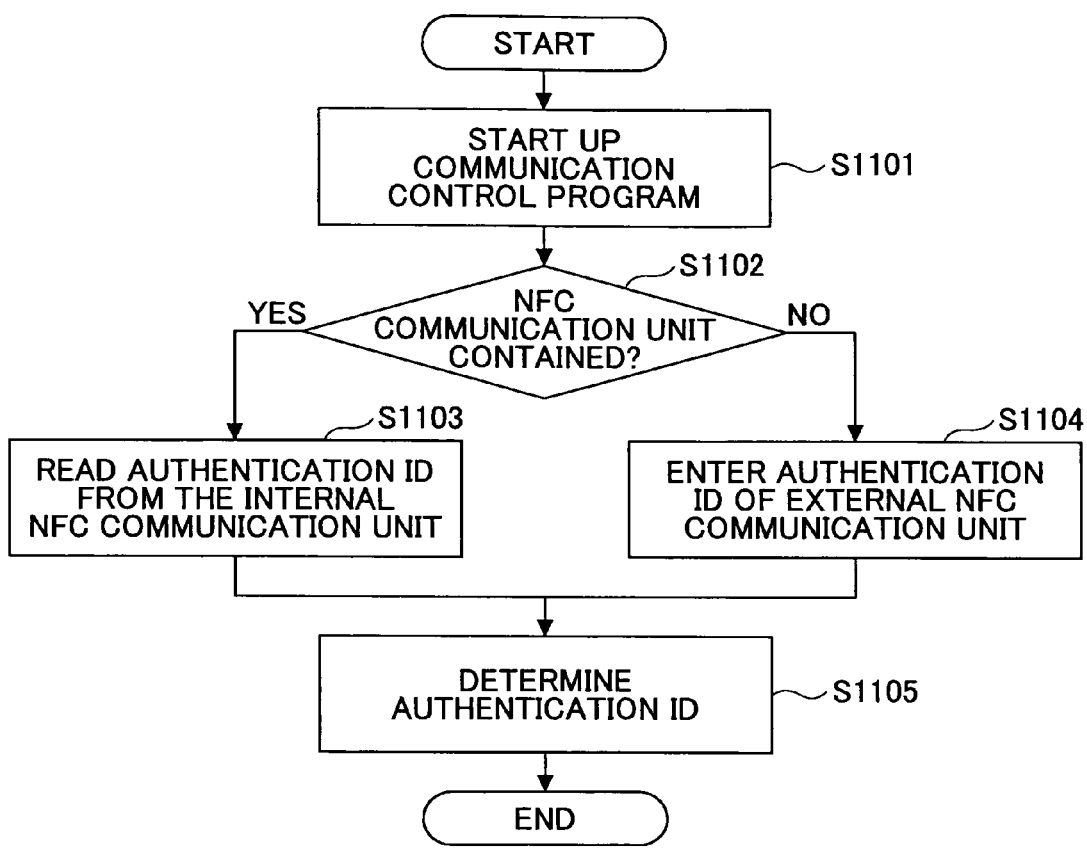
FIG. 11 shows a flowchart of a process of transmitting authentication ID from a portable terminal device to a multifunction peripheral.
Figure 12:
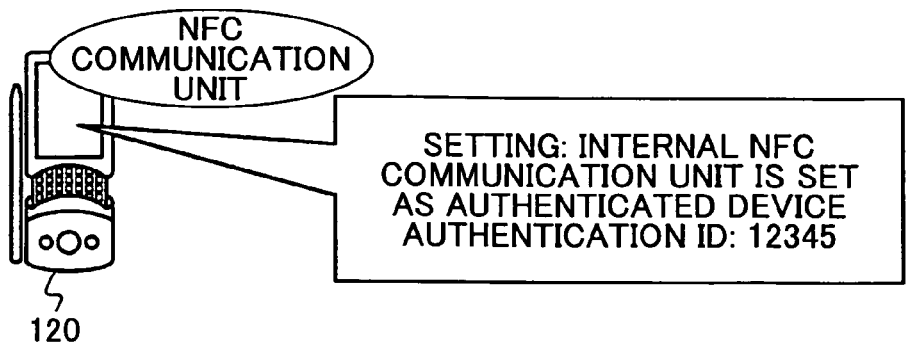
FIG. 12 shows a message displayed on a display unit (not shown) of a portable terminal device.
Figure 13:
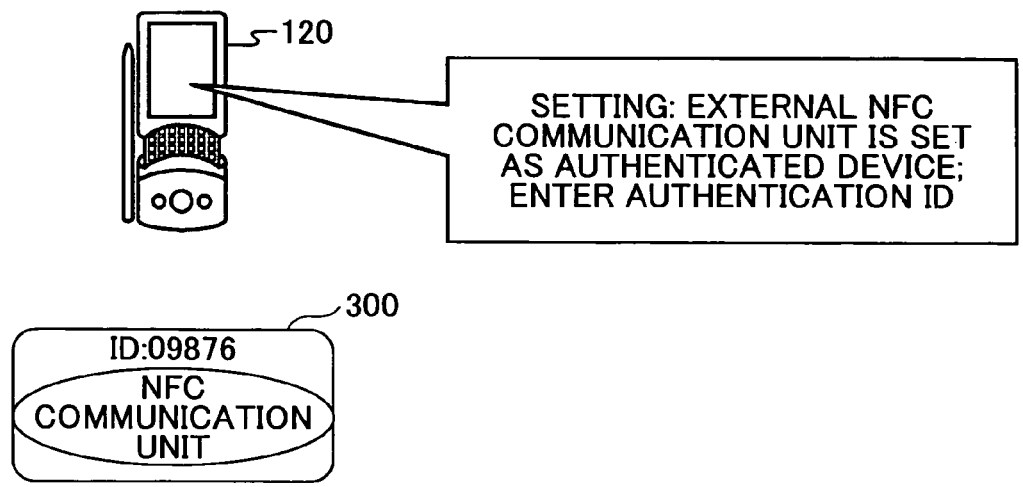
FIG. 13 shows another message displayed on the display unit (not shown) of the portable terminal device.

In the following, the process of transmitting an authentication ID to the multifunction peripheral 100 using the NFC communication unit 121 is described with reference to FIGS. 11 through 13. FIG. 11 shows a flowchart of the process of transmitting the authentication ID from the portable terminal device 120 to the multifunction peripheral 100. FIG. 12 shows an example of a message displayed on a display unit (not shown) of the portable terminal device 120. FIG. 13 shows an example of another message displayed on a display unit (not shown) of the portable terminal device 120. The communication control program is assumed to have been deactivated after the transmission of data to the multifunction peripheral 100.

First, the user operates an operating unit (not shown) of the portable terminal device 120 to start up the output application (step S1101). The output application initially determines whether or not the portable terminal device 120 has the NFC communication unit 121 (step S1102).

If the portable terminal device 120 has the NFC communication unit 121 ("Yes" in step S1102), the output application reads an authentication ID from the tag of the NFC communication unit 121 (step S1103). Then, the output application causes the message of FIG. 12 to be displayed on the display unit (not shown) of the portable terminal device 120, and determines an authentication ID to be transmitted to the multifunction peripheral 100 (step S1105). The authentication ID is then transmitted to the multifunction peripheral 100 by the NFC communication unit 121.

On the other hand, if the portable terminal device 120 does not have the NFC communication unit 121 ("No" in step S102), the output application causes the message of FIG. 13 to be displayed on the display unit (not shown) of the portable terminal device 120, thereby prompting the user to enter an authentication ID (step S1104). Upon entry of an authentication ID, the output application causes the authentication ID to be stored in the tag in the contactless IC card 300, and determines the authentication ID to be transmitted to the multifunction peripheral 100 (step S1105). After the authentication ID is stored in the tag, the NFC communication unit 121 of the contactless IC card 300 transmits the authentication ID to the multifunction peripheral 100.

Thus, upon reception of data from the portable terminal device 120 by the multifunction peripheral 100, it is determined, based on the communication-area of the communication unit that received the data, whether or not the portable terminal device 120 is within the communication area of the W-USB communication unit 104. If the portable terminal device 120 is within the communication area of the W-USB communication unit 104, the received data is printed. Thus, the leaking of confidential information from a medium on which the data is printed can be prevented while the convenience of outputting data via wireless communication is maintained. If the portable terminal device 120 is not within the communication area of the W-USB communication unit 104, the data and the authentication ID received together with the data are stored in association with one another. In this case, if the portable terminal device 120 is within the communication area of the NFC communication unit 101, an authentication ID is received from the portable terminal device 120, and the data that is stored in association with the authentication ID that is successfully authenticated is output. Thus, the output of data at a time or by a multifunction peripheral not desired by the user can be prevented.

While the present embodiment has been described with reference to the print function of the multifunction peripheral 100, the present invention may be embodied in connection with other functions of the multifunction peripheral 100, such as the FAX function. When the FAX function is utilized, for example, data stored in the data memory unit 125 of the portable terminal device 120 may be transmitted to the multifunction peripheral 100, and further transmitted from the multifunction peripheral 100 to the other multifunction peripheral 140 or another facsimile device.

Figure 14:
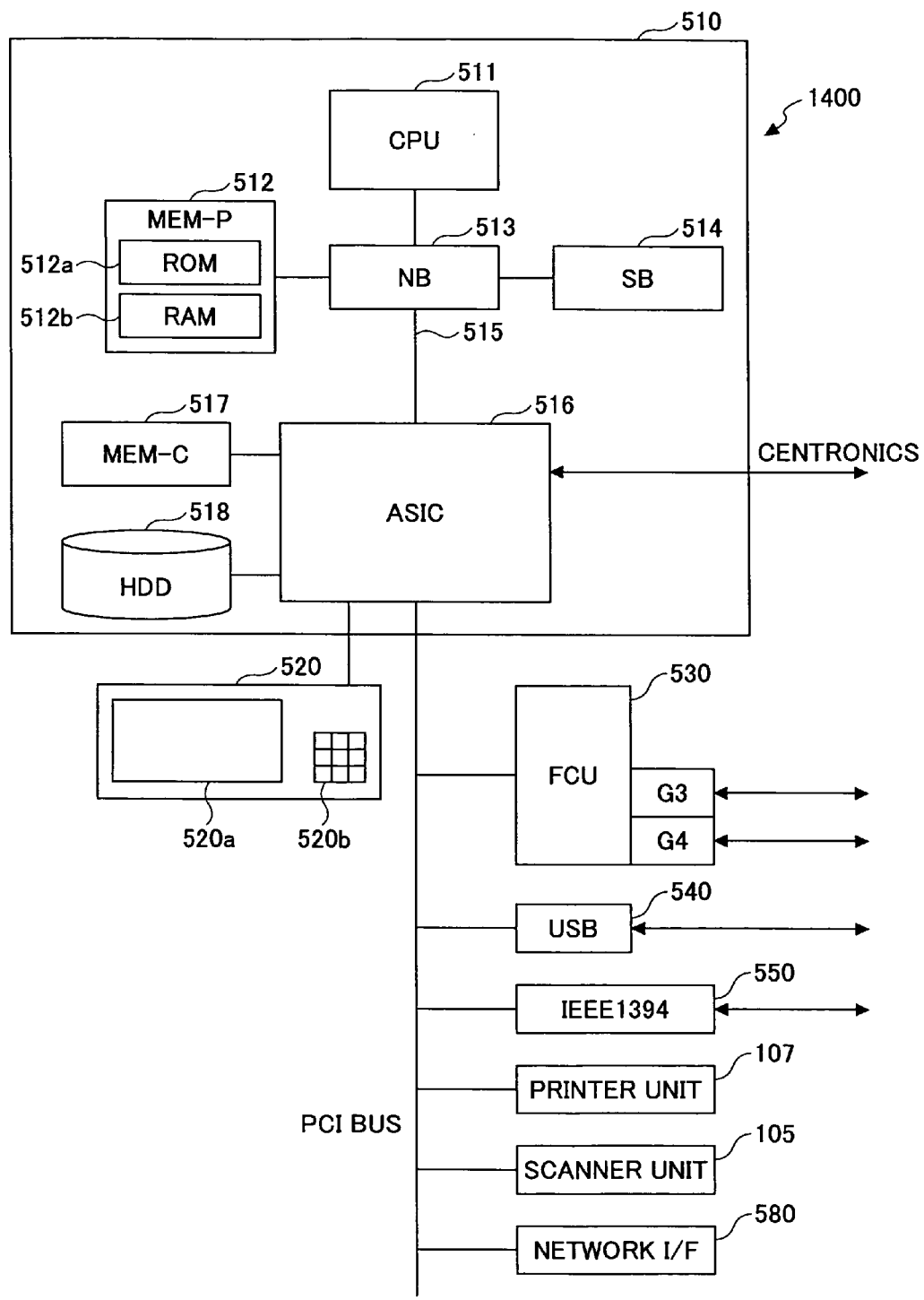
FIG. 14 shows a hardware structure of a multifunction peripheral according to an embodiment of the present invention.

In the following, a hardware structure of the multifunction peripheral 100 is described with reference to FIG. 14. As shown in FIG. 14, the digital multifunction peripheral 100 includes a controller 510 that is connected with the printer unit 107 and the scanner unit 105 via a Peripheral Component Interconnect (PCI) bus. The controller 510 controls the digital multifunction peripheral 100 as a whole, image rendering, communications, and inputs via an operating unit 520. The printer unit 107 or the scanner unit 105 includes an image processing portion for performing error diffusion for binarization or γ transform for gradation correction. The operating unit 520 includes an operation display unit 520a which may consist of a liquid crystal display (LCD) configured to display a manuscript image obtained by the scanner unit 105. The operation display unit 520a may be configured as a touch panel via which an operator can enter data. The operating unit 520 also includes a keyboard unit 520b via which an operator can enter data.

In the digital multifunction peripheral 100 according to the present embodiment, a user can select either the document box function, the copy function, the printer function, the scanner function, or the facsimile function using an application switch key provided on the operating unit 520. When the document box function is selected, a document box mode comes into effect. When the copy function is selected, a copy mode comes into effect. When the printer function is selected, a printer mode comes into effect. When the scanner function is selected, a scanner mode comes into effect. When the facsimile mode is selected, a facsimile mode comes into effect.

The controller 510 includes a central processing unit (CPU) 511 as a main unit of a computer; a system memory (MEM-P) 512; a northbridge (NB) 513; a southbridge (SB) 514; an application specific integrated circuit (ASIC) 516; a local memory (MEM-C) 517 that is a storage unit; and a hard disc drive (HDD) 518 that is also a storage unit. The NB 513 and the ASIC 516 are connected via an accelerated graphics port (AGP) bus 515. The MEM-P 512 includes a read only memory (ROM) 512a and a random access memory (RAM) 512b.

The CPU 511, which controls the digital multifunction peripheral 100 as a whole, includes a chipset consisting of the NB 513, the MEM-P 512, and the SB 514, via which chipset the CPU 511 is connected to other devices.

The NB 513 is a bridge connecting the CPU 511 and the MEM-P 512, the SB 514, and the AGP bus 515. The NB 513 includes a memory controller for controlling a read and a write from and into the MEM-P 512, a PCI master, and an AGP target.

The MEM-P 512 is a system memory which may be used as a memory for storing programs or data, a memory in which a program or data is expanded, or a memory for image rendering using a printer. The MEM-P 512, which consists of the ROM 512a and the RAM 512b, is used as a memory for storing programs for controlling the operation of the CPU 511 or data. The RAM 512b is a memory which may be used for expanding a program or data, or for image rendering with a printer.

The SB 514 is a bridge connecting the NB 513 and a peripheral component interconnect (PCI) device or a peripheral device. The SB 514 is connected to the NB 513 via the PCI bus to which a network interface (I/F) unit 580 is also connected.

The ASIC 516 is an integrated circuit(IC) for image processing purposes. The ASIC 516 functions as a bridge connecting the AGP bus 515, the PCI bus, the HDD 518, and the MEM-C 517. The ASIC 516 includes a PCI target; an AGP master; an arbiter (ARB) which is the core of the ASIC 516; a memory controller for controlling MEM-C 517; plural direct memory access controllers (DMAC) which may be configured to rotate image data using a hardware logic; and a PCI unit which may be configured to transfer data between the printer unit 107 and the scanner unit 105 via the PCI bus. To the ASIC 516 is connected a fax control unit (FCU) 530, a Universal Serial Bus (USB) 540, an IEEE (Institute of Electrical and Electronics Engineers) 1394 interface 550 via the PCI bus.

The MEM-C 517 is a local memory which may be used as a copy image buffer or a code buffer. The HDD 518 is a storage for image data, a program for controlling the operation of the CPU 511, font data, and forms.

The AGP bus 515 is a bus interface for a graphics accelerator card for increasing graphics processing speeds. The AGP bus 515 enables direct access to the MEM-P 512 at high throughput, thereby increasing the operating speed of the graphics accelerator card.

The program that is run on the multifunction peripheral 100 according to the present embodiment may be provided as recorded in a ROM. Alternatively, the program may be provided as recorded in a computer-readable recording medium, such as a Compact Disc read-only memory (CD-ROM), a flexible disc (FD), a Compact Disc-Recordable (CD-R), or a Digital Versatile Disk (DVD), in an installable or executable file format.

Further alternatively, the program that is run on the multifunction peripheral 100 of the present embodiment may be stored in a computer connected to a network such as the Internet, thus allowing the program to be downloaded via the network. The program may also be provided or distributed via a network such as the Internet.

In accordance with the present invention, the program that is run on the multifunction peripheral 100 has a module structure including the aforementioned units (the NFC communication unit, the Bluetooth communication unit, the WiFi communication unit, the W-USB communication unit, the storing unit, the authentication data storing unit, the authentication unit, the determination unit, the granting unit, the distance memory unit, and the facsimile transmit/receive unit). In actual hardware terms, the program may be read from the aforementioned ROM by the CPU and then executed to load the individual units on the main memory device, thereby generating on the main memory device the NFC communication unit, the Bluetooth communication unit, the WiFi communication unit, the W-USB communication unit, the storing unit, the authentication data storing unit, the authentication unit, the determination unit, the granting unit, the distance memory unit, or the facsimile transmit/receive unit.

The program that is run on the portable terminal device 120 according to the present embodiment may be provided as recorded in a ROM. Alternatively, the program may be provided as recorded in a computer-readable medium, such as a CD-ROM, a flexible disc, a CD-R, or a DVD.

Further alternatively, the program that is run on the portable terminal device 120 of the present embodiment may be stored in a computer connected to a network such as the Internet so that it can be downloaded via the network. The program may also be provided or distributed via a network such as the Internet.

The program that is run on the portable terminal device 120 of the present embodiment has a modular structure including the aforementioned units (the NFC communication unit, the Bluetooth communication unit, the WiFi communication unit, the W-USB communication unit, and the data storing unit). In actual hardware terms, the CPU may read the program from the ROM and execute it, whereby each of the units is loaded on the main memory device to generate the NFC communication unit, the Bluetooth communication unit, the WiFi communication unit, the W-USB communication unit, or the data storing unit on the main memory device.

While the foregoing embodiment has been described with reference to a multifunction peripheral, the present invention is not limited to such an embodiment and may be applied to various other devices, such as a copy machine, a facsimile machine, or a printer.

Although the invention has been shown and described with reference to preferred embodiments, it should be obvious that equivalents and modifications may occur to one skilled in the art without departing from the spirit and scope of the invention as defined by the appended claims.

The present application is based on the Japanese Priority Applications No. 2007-200112 filed Jul. 31, 2007 and No. 2007-330257 filed Dec. 21, 2007, the entire contents of which are hereby incorporated by reference.

What is claimed is:

1. An output device comprising:
plural communication units having different communication areas and configured to establish communication with a portable terminal device in order to receive data therefrom via contactless communication;
a determination unit configured to determine whether the portable terminal device is within a predetermined communication area based on the identified communication unit;
a granting unit configured to grant output of the data when the portable terminal device is determined to be within the predetermined communication area; and
an output unit configured to output the data whose output is granted by the granting unit, wherein
the determination unit includes an identification unit, a first determination unit and a second determination unit different from the first determination unit,
the identification unit is configured to identify one, from among the plural communication units, which receives the data from the portable terminal device,
the first determination unit is configured to determine, according to the communication unit identified by the identification unit, whether it is necessary to determine a distance to the portable terminal device based on a radio wave intensity, and
the second determination unit is configured to determine, in a case where the identification unit identifies a first communication unit and the first determination unit determines that it is not necessary to determine the distance to the portable terminal device based on the radio wave intensity, that the portable terminal device is within the predetermined communication area, and determine, in a case where the identification unit identifies a second communication unit and the first determination unit determines that it is necessary to determine the distance to the portable terminal device based on the radio wave intensity, whether the portable terminal device is within the predetermined communication area according to the distance determined based on the radio wave intensity.

2. The output device according to claim 1, wherein the determination unit determines that the portable terminal device is within the predetermined communication area when the communication area of the identified communication unit is included in the predetermined communication area.

3. The output device according to claim 1, further comprising a distance memory unit in which a radio wave intensity and a communication area of each of the communication units are stored in association with one another;
wherein the determination unit identifies the communication area associated with the radio wave intensity of the identified communication unit from the distance memory unit, wherein the determination unit determines that the portable terminal device is within the predetermined communication area when the identified communication area is included in the predetermined communication area.

4. The output device according to claim 1, wherein the second communication unit is configured to receive authentication information together with the data from the portable terminal device via contactless communication, the authentication information being used for determining whether or not use of the output device should be granted,
the first communication unit has a narrower communication area than the communication area of the second communication unit for communication with the portable terminal device and is configured to receive the authentication information from the portable terminal device via contactless communication when the portable terminal device is within the communication area of the first communication unit;
the output device further comprising:
a memory unit configured to store the data and the authentication information received by the second communication unit in association with one another;
a storing unit configured to store the data and the authentication information received by the second communication unit in the memory unit in association with one another when it is determined by the determination unit that the portable terminal device is not within the predetermined communication area; and
an authentication unit configured to authenticate use of the output device by the portable terminal device based on whether or not authentication information corresponding to the authentication information received by the first communication unit is stored in the memory unit;
wherein the granting unit grants output of the data associated with the authentication information with regard to which use of the output device by the portable terminal device is successfully authenticated by the authentication unit.

5. An information processing system comprising a portable terminal device and an output device, each of the portable terminal device and the output device including plural communication units having different communication areas and configured to establish communication in order to transmit data from the portable terminal device to the output device via contactless communication;
wherein the output device includes:
a determination unit configured to determine whether or not the portable terminal device is within a predetermined communication area based on the identified communication unit;
a granting unit configured to grant output of the received data from the output device when it is determined that the portable terminal device is within the predetermined communication area; and
an output unit configured to output the data whose output is granted by the granting unit, wherein
the determination unit includes an identification unit, a first determination unit and a second determination unit different from the first determination unit,
the identification unit is configured to identify one, from among the plural communication units, which receives the data from the portable terminal device,
the first determination unit is configured to determine, according to the communication unit identified by the identification unit, whether it is necessary to determine a distance to the portable terminal device based on a radio wave intensity, and the second determination unit is configured to determine, in a case where the identification unit identifies a first communication unit and the first determination unit determines that it is not necessary to determine the distance to the portable terminal device based on the radio wave intensity, that the portable terminal device is within the predetermined communication area, and determine, in a case where the identification unit identifies a second communication unit and the first determination unit determines that it is necessary to determine the distance to the portable terminal device based on the radio wave intensity, whether the portable terminal device is within the predetermined communication area according to the distance determined based on the radio wave intensity.

6. The information processing system according to claim 5, wherein the second communication unit is configured to transmit authentication information together with the data to the output device via contactless communication, the authentication information being used for determining whether or not use of the output device should be granted, the first communication unit of the plural communication units of the portable terminal device has a narrower communication area for communication with the output device than the communication area of the second communication unit, wherein the first communication unit is configured to transmit the authentication information to the output device via contactless communication when the output device is within the communication area of the first communication unit, a third communication unit of the plural communication units of the output device is configured to receive the authentication information together with the data from the portable terminal device via contactless communication, and a fourth communication unit of the plural communication units of the output device has a narrower communication area for communication with the portable terminal device than the communication area of the third communication unit, wherein the fourth communication unit is configured to receive the authentication information from the portable terminal device via contactless communication when the portable terminal device is within the communication area of the fourth communication unit;

wherein the output device further comprises:

a memory unit in which the data and the authentication information received by the third communication unit can be stored in association with one another;

a storing unit configured to store the data and the authentication information received by the third communication unit in the memory unit in association with one another when it is determined by the determination unit that the portable terminal device is not within the predetermined communication area; and an authentication unit configured to authenticate use of the output device by the portable terminal device based on whether or not authentication information corresponding to the authentication information received by the fourth communication unit is stored in the memory unit;

wherein the granting unit grants output of the data associated with the authentication information with regard to which use of the output devices by the portable terminal device is authenticated by the authentication unit.

7. A method of outputting data via an output device with which a portable terminal device is configured to communicate via contactless communication, each of the output device and the portable terminal device including plural communication units having different communication areas, the method comprising the steps of:

establishing communication between the output device and the portable terminal device;

receiving data from the portable terminal device via contactless communication;

identifying one of the plural communication units of the output device that receives the data from the portable terminal device;

determining, using a determination unit, whether the portable terminal device is within a predetermined communication area based on the identified communication unit of the output device;

granting output of the received data from the output device when it is determined that the portable terminal device is within the predetermined communication area; and outputting the data whose output is granted in the granting step, wherein the determination unit includes an identification unit, a first determination unit and a second determination unit different from the first determination unit, the identification unit is configured to identify one, from among the plural communication units, which receives the data from the portable terminal device, the first determination unit is configured to determine, according to the communication unit identified by the identification unit, whether it is necessary to determine a distance to the portable terminal device based on a radio wave intensity, and the second determination unit is configured to determine, in a case where the identification unit identifies a first communication unit and the first determination unit determines that it is not necessary to determine the distance to the portable terminal device based on the radio wave intensity, that the portable terminal device is within the predetermined communication area, and determine, in a case where the identification unit identifies a second communication unit and the first determination unit determines that it is necessary to determine the distance to the portable terminal device based on the radio wave intensity, whether the portable terminal device is within the predetermined communication area according to the distance determined based on the radio wave intensity.

8. The method of outputting data according to claim 7, wherein the determining step determines that the portable terminal device is within the predetermined communication area when the communication area of the identified communication unit is included in the predetermined communication area.

9. The method of outputting data according to claim 7, further including the steps of:

storing a radio wave intensity and a communication area of each of the communication units of the output device in association with one another;

measuring a radio wave intensity of the identified communication unit;

identifying a communication area associated with a radio wave intensity of the identified communication unit based on information about the radio wave intensity and the communication area of each of the communication units of the output device that is stored in the storing step; and determining that the portable terminal device is within the predetermined communication area when the identified communication area of the communication unit is included in the predetermined communication area.

10. The method of outputting data according to claim 7, including the steps of:
receiving, with the second communication unit, authentication information together with the data from the portable terminal device via contactless communication;
receiving, with the first communication unit which has a narrower communication area than the communication area of the second communication unit, the authentication information from the portable terminal device via contactless communication when the portable terminal device is within the communication area of the first communication unit;
storing the data and the authentication information received by the second communication unit in association with one another when it is determined that the portable terminal device is not within the predetermined communication area;
authenticating use of the output device by the portable terminal device based on whether authentication information corresponding to the authentication information received by the first communication unit is stored;
granting output of the data from the output device which data is associated with the authentication information with regard to which use of the output device by the portable terminal device is successfully authenticated in the authentication step.

* * * * *